United States Patent [19]

Murayama et al.

[11] Patent Number: 5,349,381
[45] Date of Patent: Sep. 20, 1994

[54] VIDEO CAMERA WITH APERTURE CORRECTION HAVING REDUCED POWER CONSUMPTION

[75] Inventors: Hideaki Murayama; Taku Kihara; Fumihiko Sudo; Takashi Asaida, all of Kanagawa, Japan

[73] Assignee: Sony Corporation, Tokyo, Japan

[21] Appl. No.: 23,931

[22] Filed: Feb. 26, 1993

[30] Foreign Application Priority Data

Feb. 28, 1992 [JP] Japan .................. 4-044099
Feb. 28, 1992 [JP] Japan .................. 4-044101

[51] Int. Cl.$^5$ .................. H04N 5/225; H04N 5/208
[52] U.S. Cl. .................. 348/252; 348/264; 348/235
[58] Field of Search .................. 358/37, 41, 162; 348/252, 235, 264; H04N 5/225, 5/208

[56] References Cited

U.S. PATENT DOCUMENTS

| | | | |
|---|---|---|---|
| 4,855,829 | 8/1989 | Kihara | 358/162 |
| 5,043,803 | 8/1991 | Asaida | 358/41 |
| 5,095,364 | 3/1992 | Asaida et al. | 358/41 |
| 5,103,299 | 4/1992 | Asaida | 358/37 |
| 5,166,782 | 11/1992 | Asaida | 358/41 |
| 5,255,081 | 10/1993 | Miyamoto et al. | 358/41 |

FOREIGN PATENT DOCUMENTS 0368354 5/1990 European Pat. Off. .
0502539 9/1992 European Pat. Off. .

*Primary Examiner*—Mark R. Powell
*Attorney, Agent, or Firm*—William S. Frommer; Alvin Sinderbrand

[57] ABSTRACT

In a video camera having three image pickup devices in which a pixel of one channel of channels forming three primary colors is spatially displaced from other pixels of two channels by ½ pixel, when three primary color signals output from the three image pickup devices are converted into digital three primary color signals, an aperture signal is formed from the digital three primary color signals, the aperture signal output is added to the digital three primary color signals and a digital video signal of a predetermined format is formed from the added signal, a clock frequency of an aperture signal forming circuit is set to be twice the clock frequencies of the image pickup devices, an A/D converting circuit and a video signal forming circuit.

31 Claims, 7 Drawing Sheets

FIG. 2A (PRIOR ART) G1
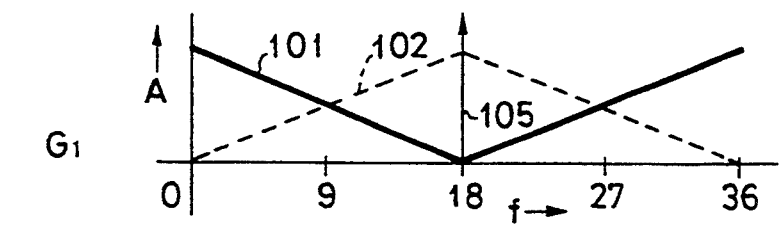
FIG. 2B (PRIOR ART) R1, B1
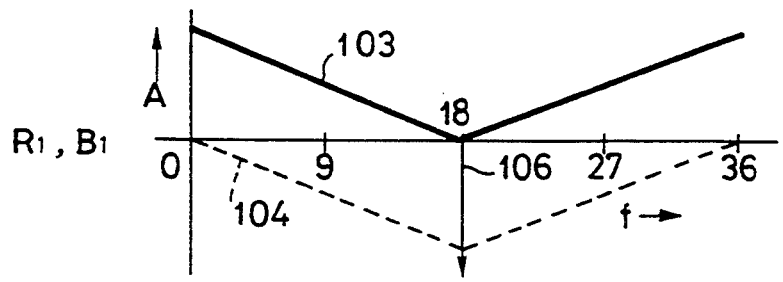
FIG. 2C (PRIOR ART) LPF 26
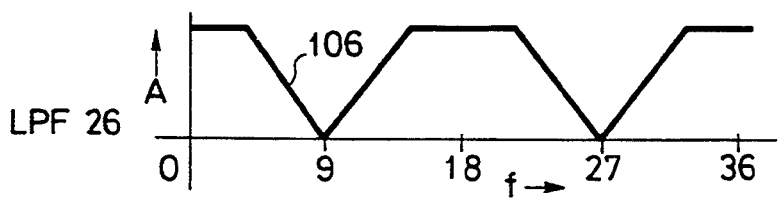
FIG. 2D (PRIOR ART) IPF 27, IPF 28
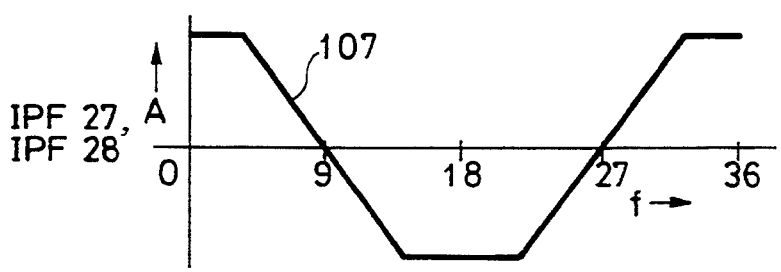
FIG. 2E (PRIOR ART) G3
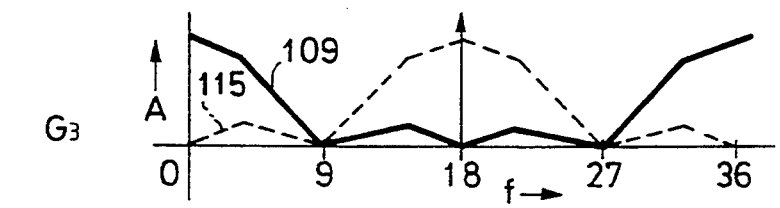
FIG. 2F (PRIOR ART) R3, B3
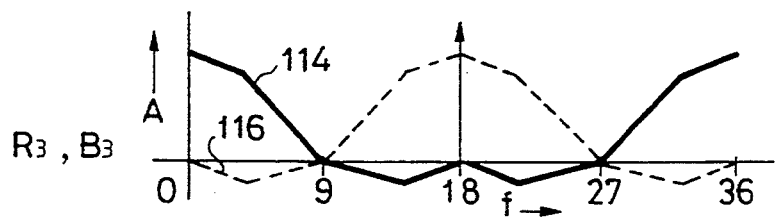

FIG. 3A  $Y_1$ (Not Corrected in Aperture)
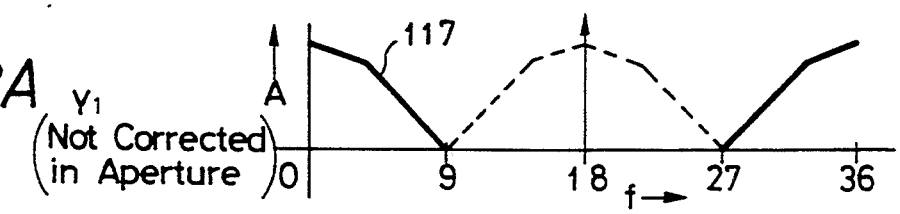
FIG. 3B  $G_2 + R_2$
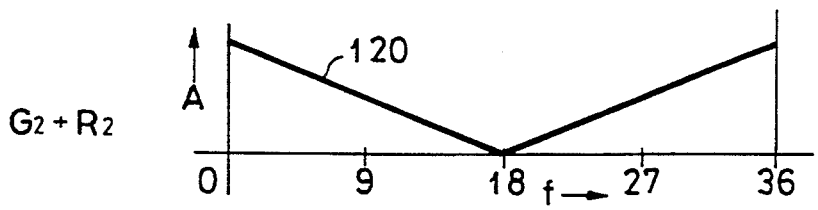
FIG. 3C  HPF 32 × LPF 33
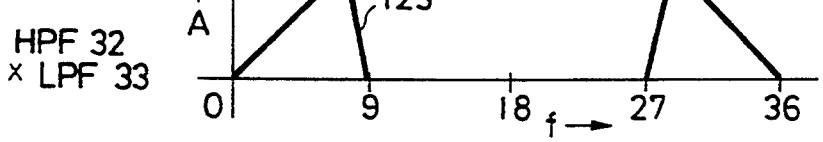
FIG. 3D  $DTL_2$
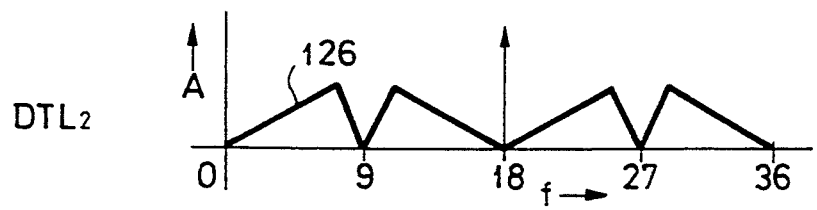
FIG. 3E  $Y_2$ (Corrected in Aperture)
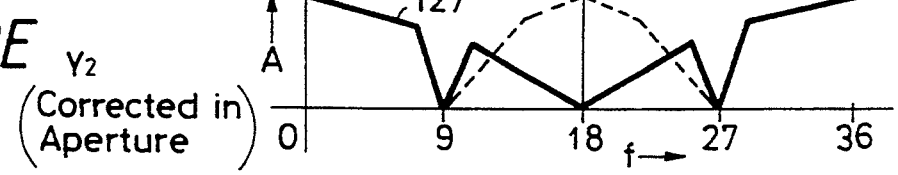
FIG. 3F  Rate Conv. 56
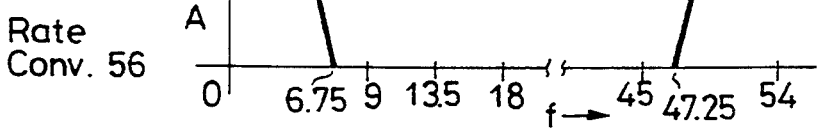
FIG. 3G  $Y_3$
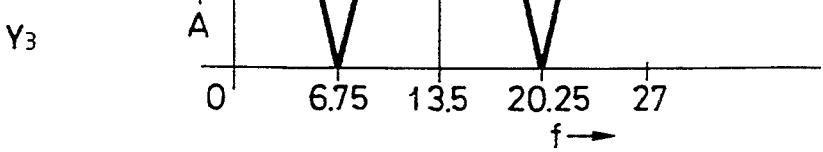

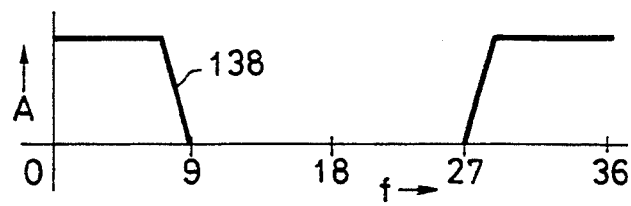
FIG. 5A  Rate Converting Ckt. 60
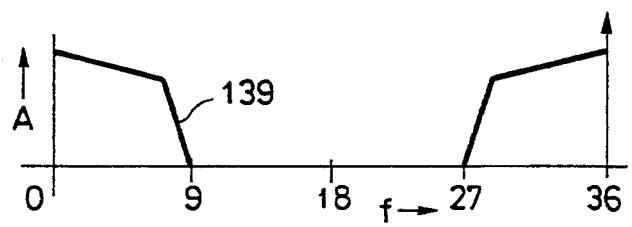
FIG. 5B  Y4
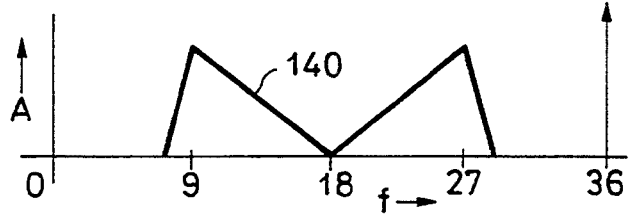
FIG. 5C  DTL5
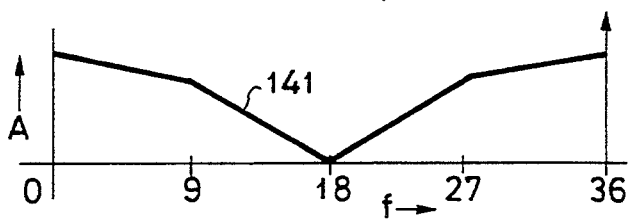
FIG. 5D  Y5

VIDEO CAMERA WITH APERTURE CORRECTION HAVING REDUCED POWER CONSUMPTION

BACKGROUND OF THE INVENTION

1. Field of the Invention

The present invention relates to a video camera having an aperture correction circuit.

2. Description of the Prior Art

U.S. Pat. No. 4,855,829, for example, describes an aperture correction circuit that is applied to a video camera. As is well known, the aperture correction circuit is utilized in order to compensate for a deterioration of response of an image pickup device and to emphasize a sharpness in the video camera.

Video cameras having a CCD (charge-coupled device) formed of 400,000 pixels are now commercially available on the market. The above 400,000-pixel CCD is driven at a horizontal drive frequency of 14.3 MHz. In the above video camera, an output signal from the 400,000-pixel CCD is converted into a digital signal serving as a main line signal by an A/D (analog-to-digital) converter. An aperture correction signal is formed from the digital signal thus converted by an aperture signal forming circuit. Then, the aperture signal thus formed and the digital signal serving as the main line signal are added to provide a corrected digital signal. The corrected digital signal is converted by a video signal forming circuit into a digital luminance signal and digital color difference signals or a digital composite video signal.

In the conventional video camera thus constructed, the A/D converter, the aperture signal forming circuit and the video signal forming circuit are all driven by a clock frequency of 14.3 MHz that is the same frequency as a horizontal drive frequency of the 400,000-pixel CCD. In that case, there are obtained 560 television lines as a horizontal limit resolution.

As a horizontal limit resolution for high-definition television receiver, there must be provided about 700 television lines or more. Therefore, in the conventional video camera, in order to increase a horizontal limit resolution, a pixel G is spatially displaced from pixels R and B by ½-pixel pitch, whereby the 400,000-pixel CCD and the A/D converter are driven by the clock frequency of 14.3 MHz and other aperture signal forming circuit, the video signal forming circuit, etc., are driven by a clock frequency of 28.6 MHz. According to this arrangement, a horizontal limit resolution can be increased to 900 television lines. However, if the video camera is arranged as described above, an electric power consumption of the circuits, in particular, an electric power consumption of the video signal forming circuit is increased considerably.

OBJECTS AND SUMMARY OF THE INVENTION

Accordingly, it is an object of the present invention to provide a video camera in which the aforesaid shortcomings and disadvantages of the prior art can be eliminated.

More specifically, it is an object of the present invention to provide a video camera in which an electric power consumption of a signal processing circuit can be reduced comparatively.

It is another object of the present invention to provide a video camera in which can provide a horizontal resolution of television lines sufficient for actual practice.

In order to achieve the aforesaid objects, according to the present invention, there is provided a video camera having three image pickup devices in which a pixel of one channel of channels forming three primary colors is spatially displaced from other pixels of two channels by ½ pixel. This video camera comprises an analog-to-digital (A/D) converting circuit for converting analog three primary color signals output from the three image pickup devices into digital three primary color signals, an aperture signal forming circuit supplied with output signals of the A/D converting circuit and forming an aperture signal from the digital three primary color signals, an adding circuit for adding the aperture signal output from the aperture signal forming circuit and the digital three primary color signals output from the A/D converting circuit, and a video signal forming circuit for forming a digital video signal of a predetermined format from a signal output from the adding circuit, wherein a clock frequency of the aperture signal forming circuit is set to be twice the clock frequencies of the image pickup devices, the A/D converting circuit and the video signal forming circuit.

BRIEF DESCRIPTION OF THE DRAWINGS

A better understanding of other objects, features, and advantages of the present invention can be gained from a consideration of the following description of illustrative embodiments of the present invention, in conjunction with the figures of the accompanying drawings, in which:

FIGS. 2A to 2F are frequency characteristic diagrams used to explain operation of the video camera shown in FIG. 1, respectively;

FIGS. 3A to 3G are frequency characteristic diagrams used to explain operation of the video camera shown in FIG. 1, respectively;

FIGS. 5A to 5D are frequency characteristic diagrams used to explain the video camera shown in FIG. 4, respectively.

DETAILED DESCRIPTION OF THE PREFERRED EMBODIMENTS

The present invention will now be described with reference to the drawings.

Figures 1, 1A:
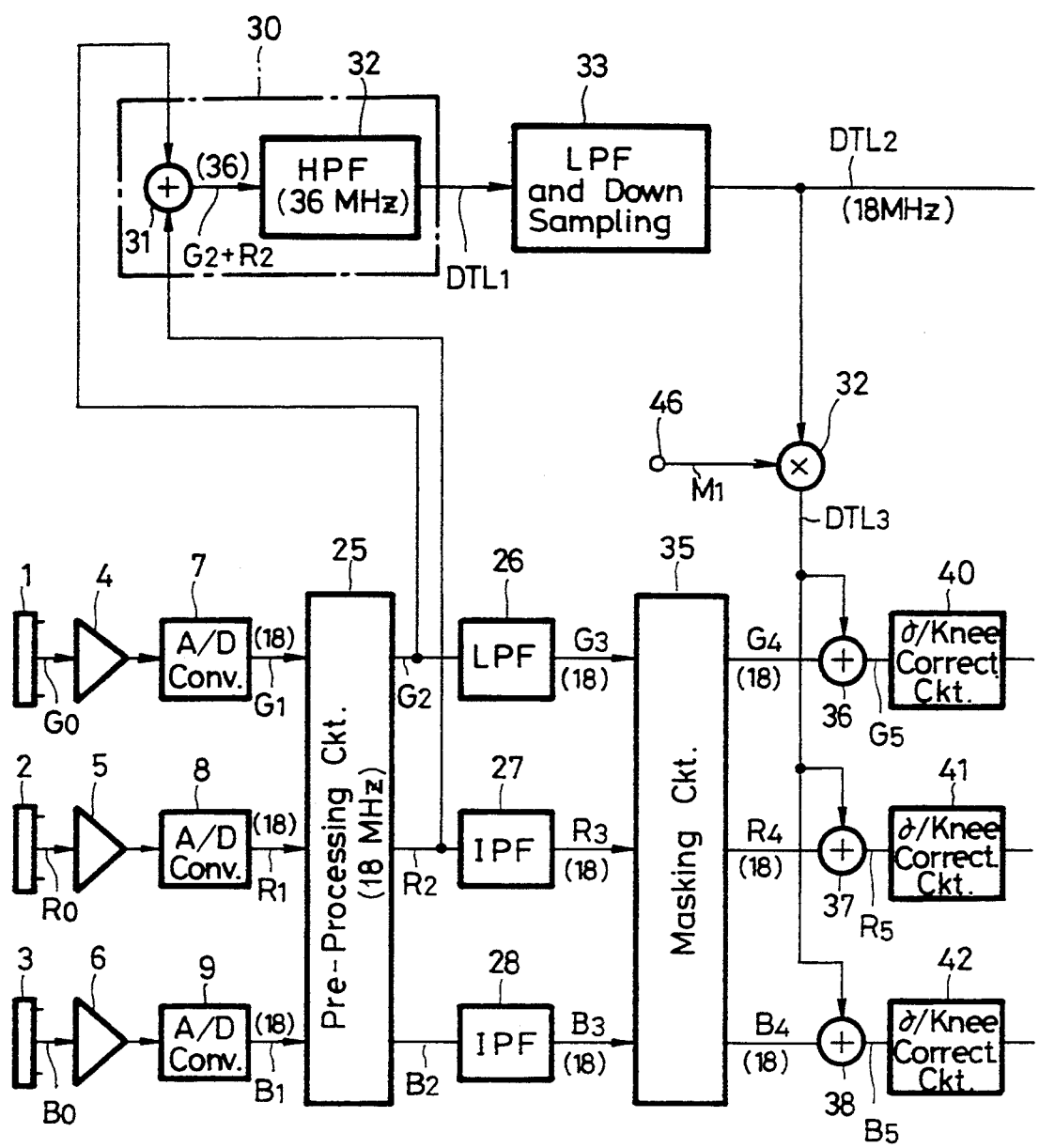
FIG. 1 (formed of FIGS. 1A and 1B) is a block diagram showing a video camera according to a first embodiment of the present invention.
Figure 1B:
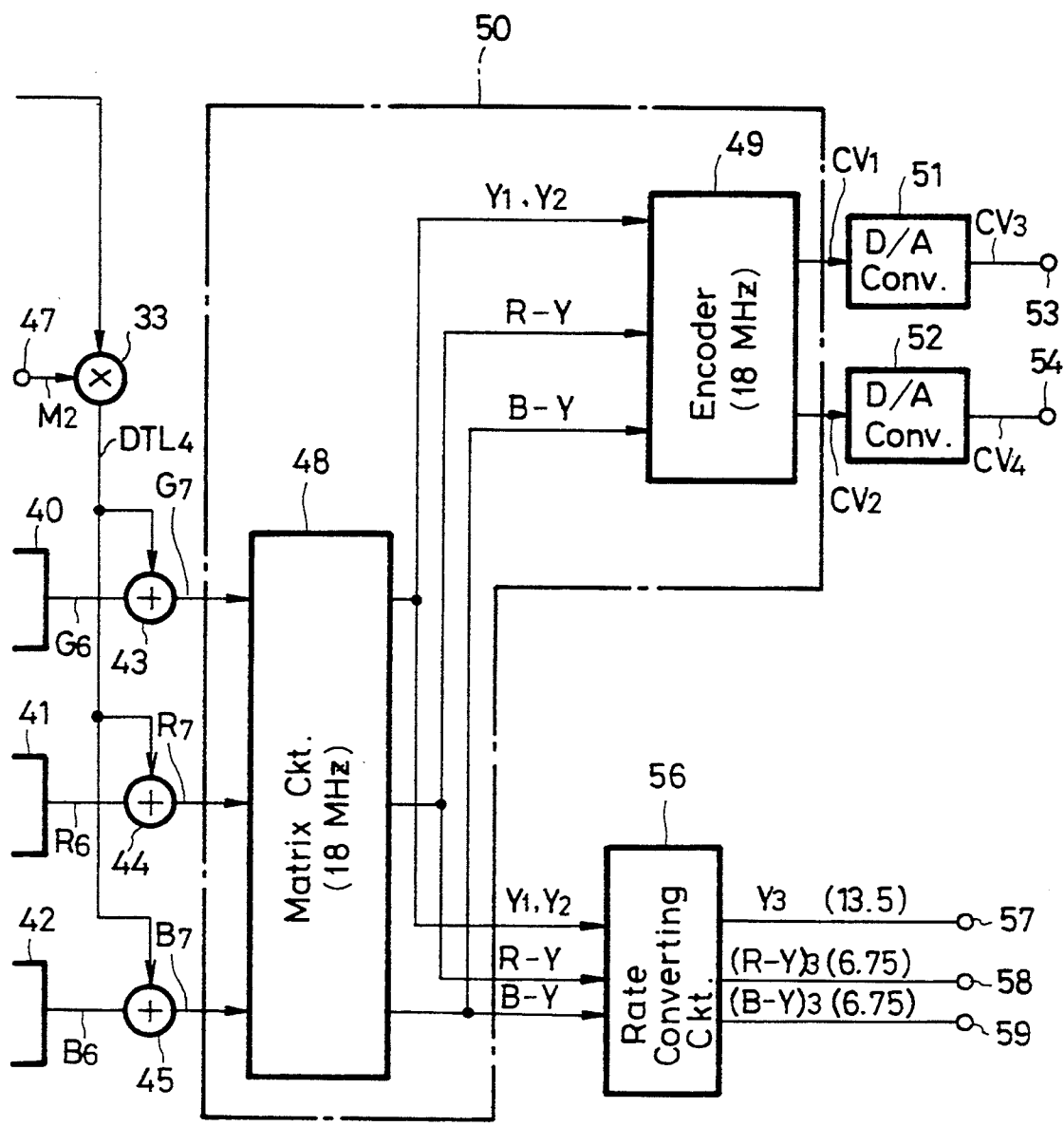

As shown in FIG. 1 (formed of FIGS. 1A, 1B drawn on two sheets of drawings so as permit the use of a suitably large scale) of the accompanying drawings, there are provided two-dimensional image pickup devices 1 to 3 that are CCDs correspondingly assigned to respective channels of three primary colors, respectively. In these CCDs 1 to 3, one pixel (in this case, pixel G) constructing three-primary color pixels is spatially (optically) displaced from remaining two pixels (pixels R and B) by a ½-pixel pitch. Each of these CCDs 1 to 3 includes 500,000 pixels and is driven by a horizonal drive frequency of 18 MHz.

Analog three-primary color signals $G_0$, $R_0$, $B_0$ from the CCDs 1 to 3 are supplied through amplifiers 4 to 6 to A/D converters 7 to 9, each having a clock frequency of 18 MHz, respectively. The A/D converters 7 to 9 convert the elctrical signals supplied thereto from the CCDs 1 to 3 into digital three-primary color signals $G_1$, $R_1$, $B_1$, respectively. In FIG. 1, clock frequencies (MHz) of respective circuits are shown in a parenthesized fashion such as (18 MHz), (18) or the like in circuit blocks or near signal lines.

FIG. 2A shows a frequency characteristic of the signal $G_1$ (abscissa represents a frequency f (MHz) and ordinate represents a standardized amplitude A). In FIG. 2A, a frequency characteristic 101 shown by a solid line from a direct current (hereinafter referred to as a DC, if necessary) to 18 MHz represents a base band component and a frequency characteristic 102 shown by a dashed line from DC to 18 MHz represents an alias component, respectively. In this embodiment, since the band of the analog video signal that is finally required is limited to 9 MHz, a frequency component of higher than 18 MHz need not be considered. The reason that the frequency band of the signals $G_1$, $R_1$ and $B_1$ are considered up to 18 MHz is that a characteristic of an optical LPF (low pass filter), not shown, interposed between the CCDs 1 to 3 and a lens (not shown) has a band of from DC to 18 MHz. The above optical LPF has a gentle attenuation characteristic inherently so that, if an optical LPF having a band of DC to 9 MHz is utilized, then a signal component up to 9 MHz is reduced too much and an S/N (signal-to-noise) is deteriorated. For this reason, the optical LPF having the band of from DC to 18 MHz is utilized.

FIG. 2B shows frequency characteristics of the signals $R_1$ and $B_1$. In FIG. 2B, a frequency characteristic 103 shown by a solid line from DC to 18 MHz represents a base band component and a frequency characteristic 104 shown by a dashed line represents an alias component, respectively.

The alias components having the above frequency characteristics 102, 104 are produced by the sampling processing in the A/D converters 7 to 9. In FIGS. 2A and 2B, the frequency characteristics 102, 104 of the alias components are inverted about a frequency axis. The reason for this is considered as follows. Since the CCDs 1 to 3 are spatially displaced by ½-pixel pitch, a sub-Nyquist sampling is effected so that a sampling cycle in the A/D converters 8, 9 is displaced from that of the A/D converter by a phase $\pi$.

The clock (sampling) frequency of 18 MHz is represented by a positive direction arrow 105 in FIG. 2A, and the clock (sampling) frequency of 18 MHz is represented by a negative direction arrow 106. The negative direction arrow 106 is used in order to express that the phase is displaced by $\pi$ from the cycle of the clock frequency shown by the positive direction arrow 105.

The signals $G_1$, $R_1$, $B_1$ having the above frequency characteristics are supplied to a pre-processing circuit 25. The pre-processing circuit 25 processes the signals $G_1$, $R_1$, $B_1$ in some suitable processing fashion such as an interpolation of defective pixel or the like and then outputs interpolated signals $G_2$, $R_2$, $B_2$. In this embodiment, the frequency characteristics of the interpolated signals $G_2$, $R_2$ and $B_2$ are equal to the characteristics 101, 103 of the signals $G_1$, $R_1$ and $B_1$.

The signal $G_2$ is supplied to an LPF 26 and one input terminal of an adder 31 constructing an aperture signal forming circuit 30. The signal $R_2$ is supplied to an interpolation filter (IPF) 27 and the other input terminal of the adding circuit 31. The signal $B_2$ is supplied to an IPF 28.

FIG. 2C shows a frequency characteristic 106 of the LPF 26 having a cut-off frequency of 9 MHz to which the signal $G_2$ is supplied. FIG. 2D shows frequency characteristics 107 of the IPFs 27 and 28 to which the signal $R_2$ is supplied. Each of the IPFs 27 and 28 comprises a ½-pixel group delay element for making the phase of the signal $B_2$ to that of the signal $G_2$ and a LPF having the same arrangement as that of the LPF 26.

FIG. 2E shows a frequency characteristic of a signal $G_3$ which results from processing the signal $G_2$ having the frequency 101 by the LPF 26. Also in FIG. 2E, only a frequency characteristic 109 from DC to 9 MHz shown by a solid line must be considered. The frequency characteristic of the signal $G_3$ shown in FIG. 2E is obtained in response to a product of transfer functions of the signal $G_1$ shown in FIG. 2A and the LPF 26 shown in FIG. 2C.

FIG. 2F shows frequency characteristics of signals $R_3$, $G_3$ which result from processing the signals $R_2$ and $B_2$ having the frequency characteristic 103 by the LPFs 27, 28. In this case, only a frequency characteristic 115 from DC to 9 MHz shown by a solid line must be considered. The frequency characteristics of the signals $R_3$, $B_3$ shown in FIG. 2F are obtained in response to a product of the transfer functions of the signals $R_1$, $B_1$ shown in FIG. 2B and of the IPFs 27, 28 shown in FIG. 2D.

Study of FIGS. 2E and 2F reveals that the frequency band is limited to DC to 9 MHz and the alias components within such frequency band are attenuated to frequency characteristics 115, 116 shown by dashed lines.

The signals $G_3$, $R_3$, $B_3$ whose phase differences are canceled are corrected in color by a masking circuit 35 and provided as signals $G_4$, $R_4$, $B_4$, respectively. The signals $G_4$, $R_4$, $B_4$ are respectively added to an aperture signal $DTL_3$ by adding circuits 36 to 38, thereby being produced as signals $G_5$, $R_5$, $B_5$, respectively. The signals $G_5$, $R_5$, $B_5$ are corrected in gamma characteristic and knee characteristic by $\gamma$/knee correcting circuits 40 to 42, thereby being produced as signals $G_6$, $R_6$, $B_6$, respectively. The signals $G_6$, $R_6$, $B_6$ are added to an aperture signal $DTL_4$, respectively, by adding circuits 43 to 45, thereby being produced as signals $G_7$, $R_7$, $B_7$ thus aperture-corrected. When the aperture correction processing is not carried out, the aperture signals $DTL_3$, $DTL_4$ supplied to the adding circuits 36 to 38 and the adding circuits 43 to 45 are both held at zero value because mixing ratio signals $M_1$, $M_2$ supplied to the adding circuits 32, 33 through terminals 46, 47 from a system controller (not shown) are held at zero value.

The signals $G_7$, $R_7$, $B_7$ are supplied to a matrix circuit 48 of a video signal forming circuit 50 that is formed of a matrix circuit 48 and an encoder 49. The matrix circuit 48 converts the signals $G_7$, $R_7$, $B_7$ into luminance signals $Y_1$, $Y_2$ and color difference signals $(R-Y)$, $(B-Y)$ forming a digital video signal.

FIG. 3A shows a frequency characteristic of the luminance signal $Y_1$ provided when the aperture correction processing is not carried out. In this case, the frequency characteristic 117 of the base band shown by a solid line must be considered. As will be clear from the frequency characteristic 117, alias components of the frequency characteristics 115, 116 (see FIGS. 2E and 2F) of the signals $G_3$, $R_3$, $B_3$ are canceled by the calculation within the matrix circuit 48 so that no alias component exists in the base band component of the luminance signal $Y_1$.

When a luminance signal $Y_2$ provided after the aperture correction processing is obtained, the signal $G_2$ and the signal $R_2$ are added at a twice drive clock frequency 36 MHz by the adding circuit 31 within the aperture signal forming circuit to thereby obtain an added signal $(G_2+R_2)$. The reason that the signals $G_2$ and $R_2$ are added at 36 MHz is that the signal component of the signal $G_2$ exists in the signal component of the signal $R_2$ due to the above $\frac{1}{2}$-pixel displacement.

FIG. 3B shows a frequency characteristic of the added signal $(G_2+R_2)$. A frequency characteristic 120 is a characteristic that results from synthesizing the frequency characteristic shown in FIG. 2A and the frequency characteristic shown in FIG. 2B. Thus, the alias components of DC to 18 MHz are canceled and do not exist in the frequency characteristic 120.

FIG. 3C shows a synthesized frequency characteristic of a high-pass filter (HPF) 32 constructing the aperture correction circuit 30 and a LPF 33 connected to the output of the HPF 32, i.e., a BPF (bandpass filter) characteristic, or a differential characteristic. In the LPF 33, after the band of the aperture signal $DTL_1$ is limited to DC to 9 MHz by a drive clock frequency of 36 MHz, a so-called down sampling is carried out by a drive clock frequency of 18 MHz to thereby select necessary data and throw away remaining data. The down sampling is carried out in order to add the aperture signal $DTL_2$ to the signals $G_4$, $R_4$, $B_4$ and the signals $G_6$, $R_6$, $B_6$ which are main line signals operable at 18 MHz.

FIG. 3D shows a frequency characteristic of the aperture signal $DTL_2$ which is the output signal of the LPF 31. This frequency characteristic is obtained in response to a product of a transfer function corresponding to the frequency characteristic 120 shown in FIG. 3B and a transfer function corresponding to the frequency characteristic shown in FIG. 3C. In this case, the frequency characteristic from DC to 9 MHz must be considered.

The aperature signal $DTL_2$ having such characteristic is multiplied at the mixing ratios $M_1$, $M_2$ by the multiplying circuits 32, 33 and are thereby produced as the aperture signals $DTL_3$ and $DTL_4$ having predetermined amplitudes and then added to the signals $G_4$, $R_4$, $B_4$ and the signals $G_6$, $R_6$, $B_6$, respectively.

FIG. 3E shows a frequency characteristic 127 of the aperture-corrected luminance signal $Y_2$ that is the output signal of the matrix circuit 48. The frequency characteristic 127 shows a frequency characteristic of the luminance signal $Y_2$ which results from adding the luminance signal $Y_1$ having the frequency characteristic 117 shown in FIG. 3A and the aperture signal $DTL_2$ having the frequency characteristic 126 shown in FIG. 3D. The frequency characteristic 127 from DC to 9 MHz of this luminance signal $Y_2$ contains no alias component.

Then, the luminance signal $Y_1$ and the color difference signals (R−Y), (B−Y) which are not aperture-corrected and the luminance signal $Y_2$ and the color difference signals (R−Y), (B−Y) which are aperture-corrected are converted by an encoder 49 into composite video signals $CV_1$ (monochrome), $CV_2$ (color) which are digital video signals, converted by D/A (digital-to-analog) converters 51,52 into analog composite video signals $CV_3$, $CV_4$ and then supplied through an output terminal 53 to a viewfinder (not shown) and through an output terminal 54 to the outside. Since the thus converted analog composite video signals $CV_3$, $CV_4$ are limited in band to 9 MHz by analog LPFs before they are used in actual practice, a signal component (noise component) exceeding 9 MHz need not be considered. Even when the aperture correction processing is carried out, the aperture correction signal $DTL_3$ having the same amplitude is added to the signals $G_4$, $R_4$, $B_4$ and the aperture correction signal $DTL_4$ having the same amplitude is added to the signals $G_6$, $R_6$, $B_6$. Therefore, the color difference signals (R−Y), (B−Y) are not changed even when the luminance signal $Y_1$ that is not processed by the aperture correction is changed to the aperture-corrected luminance signal $Y_2$.

The luminance signals $Y_1$, $Y_2$ and the color difference signals (R−Y), (B−Y) are temporarily converted by a rate converting circuits 56 into 54 MHz which is the lowest common multiple of 18 MHz and 13.5 MHz and then converted into digital video signals $Y_3$, $(R-Y)_3$, and $(B-Y)_3$ of a so-called D1 format formed of a luminance signal $Y_3$ having a clock frequency of 13.5 MHz and color difference signals (R−Y), (B−Y) having a clock frequency of 6.75 MHz.

FIG. 3F shows a frequency characteristic 134 of LPF within the rate converting circuit 56. In this rate converting circuit 56, the band is temporarily limited to 6.72 MHz by the above LPF and data are thinned at every four to provide an output of 13.5 MHz.

The luminance signal $Y_3$ and the color difference signals $(R-Y)_3$ and $(B-Y)_3$ which are digital video signals thus converted to the D1 format are supplied through output terminals 57 to 59 to a video tape recorder (not shown). FIG. 3G shows a frequency characteristic 137 of the luminance signal $Y_3$.

As described above, according to this embodiment, the CCDs 1 to 3, each having 500,000 pixels disposed in a spatial pixel displacement fashion are utilized so that other circuit elements than the aperture signal forming circuit 59, the LPF portion of the LPF 33 and the rate converting circuit 56 are driven at the same clock frequency of 18 MHz as the horizontal drive frequency of the CCDs 1 to 3. The high band components of the signals $G_2$, $R_2$ are added at 36 MHz which is twice the above clock frequency 18 MHz in the aperture signal forming circuit 30 and only the high band component is passed by the HPF 32 to thereby form the aperture signal $DTL_1$. Thereafter, by the LPF 33 and the so-called down sampling processing within the LPF 33, the frequency is thinned to 18 MHz to form the aperture signal $DTL_2$. Then, the aperture signals $DTL_3$, $DTL_4$ corresponding to the aperture signal $DTL_2$ are added to the signals $G_4$, $R_4$, $B_4$ and the signals $G_6$, $R_6$, $B_6$ serving as the main line signals at the operation frequency of 18 MHz. Then, on the basis of the aperture-corrected signals $G_7$, $R_7$, $B_7$, the luminance signal $Y_2$ and the color difference signals (R−Y), (B−Y) which are digital video signals and the composite video signals $CV_1$, $CV_2$ which are digital video signals are formed by the video signal forming circuit 50.

According to the above-mentioned processing, the high-definition property can be maintained by the aperture correction processing based on the aperture signal forming circuit 30 operated at the twice clock frequency, 36 MHz and the horizontal limit resolution of picture displayed on the composite video signals $CV_1$, $CV_2$ becomes about 720 television lines, which can provide a sufficient resolution in actual practice.

Further, since the clock frequencies of the circuits except the aperture signal circuit 30 are fundamentally selected to be 18 MHz which are half of the clock frequency 36 MHz for driving the aperture signal forming circuit 30, an electric power consumption of the circuit, in particular, the electric power consumption of the video signal forming circuit 50 can be reduced considerably.

As described above, according to the video camera of the present invention, the drive clock frequency of the aperture signal forming circuit is selected to be twice the clock frequencies of the image pickup device, the A/D converter, the adding circuit and the video signal forming circuit. Therefore, the high-definition property can be maintained by the aperture correction processing based on the aperture signal forming circuit driven by the twice clock frequency and the horizontal resolution can be increased to the television lines sufficient for actual practice.

Furthermore, the electric power consumption of the circuits other than the aperture signal forming circuit can be reduced comparatively and the electric power consumption of the whole of the circuits can be reduced.

Figures 4, 4A:
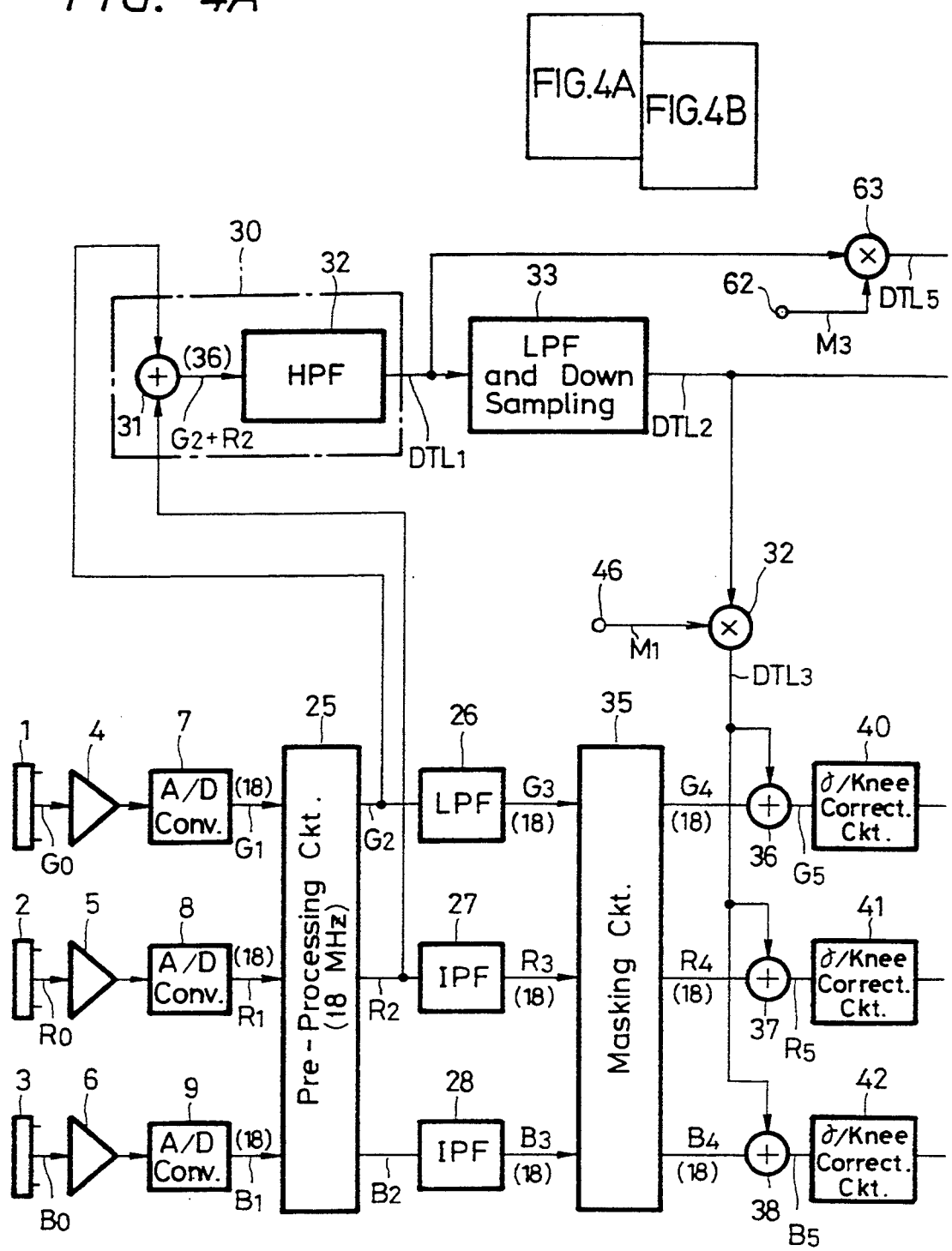
FIG. 4 (formed of FIGS. 4A and 4B) is a block diagram showing a video camera according to a second embodiment of the present invention.
Figure 4B:
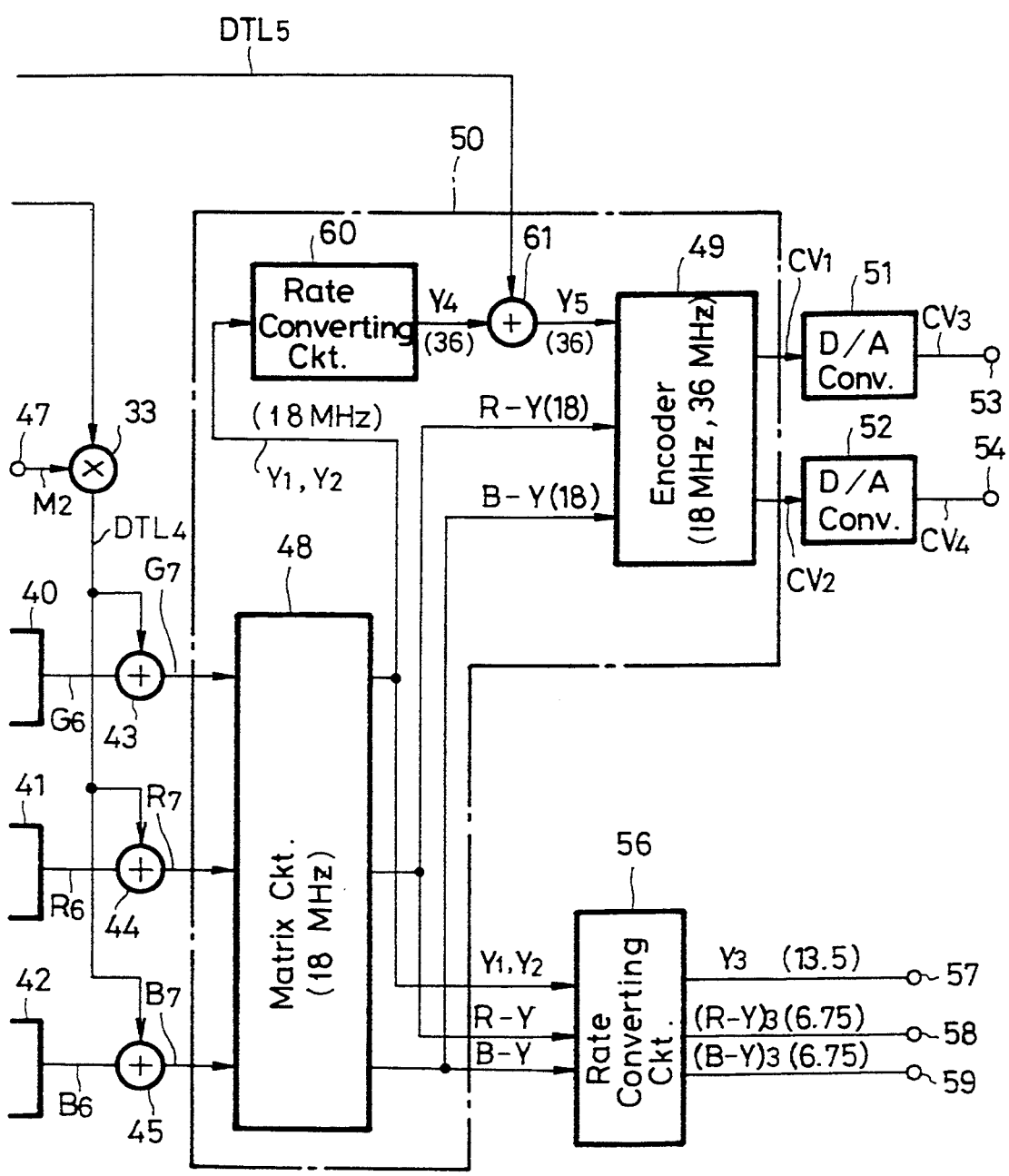

A second embodiment of the video camera according to the present invention will be described next with reference to FIG. 4 (formed of FIGS. 4A and 4B drawn on two sheets of drawings so as to permit the use of a suitably large scale). In FIG. 4, like parts corresponding to those of FIG. 1 are marked with the same references and therefore need not be described in detail.

In the second embodiment shown in FIG. 4, the band of the analog video signal required by the matrix circuit 48 is limited to 9 MHz and components of higher than 18 MHz in the frequency characteristic of the signal $G_1$ shown in FIG. 2A therefore need not be considered. Further, in the second embodiment shown in FIG. 4, the video signal forming circuit 50 comprises the matrix circuit 48, a rate converting circuit 60, an adding circuit 61 and the encoder 49. In the second embodiment shown in FIG. 4, the luminance signals $Y_1$, $Y_2$ output from the matrix circuit 48 are converted by the rate converting circuit 60 into a luminance signal $Y_4$ having a twice clock frequency 36 MHz.

FIG. 5A shows a frequency characteristic (LPF characteristic of 9 MHz) of the rate converting circuit 60. FIG. 5B shows a frequency characteristic 139 of the luminance signal $Y_4$ that is the output signal of the rate converting circuit 60. The luminance signal $Y_4$ is supplied to one input terminal of the adding circuit 61. FIG. 5C shows a frequency characteristic 140 of an aperture signal $DTL_5$ supplied to the other input terminal of the adding circuit 61.

The aperture signal $DTL_5$ is an attenuated signal which results from multiplying the aperture signal $DTL_1$, formed by the aperture signal forming circuit 30 on the basis of the signals $G_2$, $R_2$ with a value of a mixing ratio signal M3 supplied to a multiplying circuit 63 through a terminal from a system controller (not shown). This aperture signal $DTL_5$ is added to the luminance signal $Y_4$ serving as the main line signal by the adding circuit 61 to provide a luminance signal $Y_5$ having a frequency characteristic 141 (see FIG. 5D) in which a high band component is compensated for. An operation frequency of the luminance signal $Y_5$ is 36 MHz.

The luminance signal $Y_5$ and the color difference signals (R−Y) and (B−Y) are supplied to the encoder 49. In the encoder 49, the color difference signals (R−Y) and (B−Y) are mixed with carrier signals (not shown) by two balancing modulators (not shown) to provide a carrier chrominance signal (not shown). This carrier chrominance signal is converted by a rate converting circuit (not shown) into a carrier chrominance signal having a clock frequency of 18 MHz to 36 MHz. Then, the carrier chrominance signal of 36 MHz and the luminance signal of 36 MHz are added by an adding circuit (not shown) having a clock frequency of 36 MHz to provide a signal in which the luminance signal $Y_5$ and the carrier chrominance signal are superimposed upon each other. The signal thus superimposed is added with a synchronizing signal and is thereby converted into the composite video signal $CV_2$ which is the digital video signal. Further, the synchronizing signal is added to the luminance signal $Y_5$ to provide the composite signal $CV_1$ (monochrome) which is the digital video signal.

The composite video signals $CV_1$, $CV_2$ are converted by the D/A converters 51, 52 into analog composite video signals $CV_3$, $CV_4$ and then supplied through the output terminal 53 to the viewfinder (not shown) and also supplied through the output terminal 54 to the outside. The analog composite video signals $CV_3$, $CV_4$ thus converted are limited in band to about 18 MHz by an analog LPF before being used.

As described above, according to the second embodiment, the CCDs 1 to 3, each having 500,000 pixels disposed in a spatial pixel displacement fashion are utilized so that other circuit elements than the aperture signal forming circuit 30, one portion of the LPF 33, the rate converting circuits 56, 60, the adding circuit 61 and the encoder 49 are driven at the same clock frequency of 18 MHz as the horizontal drive frequency of the CCDs 1 to 3. The high band components of the signals $G_2$, $R_2$ are added at 36 MHz which is twice the above clock frequency 18 MHz in the aperture signal forming circuit 30 and only the high band component is passed by the HPF 32 to thereby form the aperture signal $DTL_1$. Thereafter, by the LPF 33 and the so-called down sampling processing within the LPF 33, the frequency is thinned to 18 MHz to form the aperture signal $DTL_2$. Then, the aperture signals $DTL_3$, $DTL_4$ corresponding to the aperture signal $DTL_2$ are added to the signals $G_4$, $R_4$, $B_4$ and the signals $G_6$, $R_6$, $B_6$ serving as the main line signals at the operation frequency of 18 MHz. Then, on the basis of the aperture-corrected signals $G_7$, $R_7$, $B_7$, the luminance signal $Y_2$ and the color difference signals (R−Y), (B−Y) which are digital video signals are formed by the matrix circuit 48 forming the video signal forming circuit 50. Further, the luminance signal $Y_5$ whose high band component is compensated for is formed by the rate converting circuit and the adding circuit 61. Thereafter, the digital video signals $CV_1$, $CV_2$ which are the digital video signals are formed by the encoder 49.

According the above processing, a high-definition property can be maintained by the aperture correction processing based on the aperture signal forming circuit 30 that is driven at the twice clock frequency 36 MHz and a horizontal limit resolution of picture displayed on the basis of the composite video signals $CV_1$, $CV_2$ becomes substantially about 1000 television lines, which can provide a relatively high resolution.

Further, since the circuits that can operate at the clock frequency 36 MHz are limited to the aperture signal forming circuit 30, the rate converting circuit 60, the encoder 49 or the like, the electric power consumption of the whole of the circuits can be reduced relatively.

As described above, according to the video camera of the present invention, the clock frequencies of the aperture signal forming circuit and the second adding circuit are set to be twice the clock frequencies of the image pickup device, the A/D converter and the matrix circuit. Therefore, the high-definition property can be maintained by the aperture correction processing based on the aperture signal forming circuit and the second adding circuit that can be driven by the above twice clock frequency. Hence, the horizontal resolution can be increased.

Furthermore, since the electric power consumptions of other circuits than the aperture signal forming circuit and the second adding circuit can be reduced relatively, the electric power consumption of the whole of the circuits can be reduced comparatively.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A video camera having three image pickup devices each operating at a first clock frequency and in which a pixel of a respective one of three channels forming three analog primary color signals is spatially displaced from pixels of said other two channels by ½ pixel, comprising:
   means for converting said three analog primary color signals from said three image pickup devices into three digital primary color signals, said means for converting operating at said first clock frequency;
   aperture signal forming means for forming an aperture signal from at least one of said three digital primary color signals, said aperture signal forming means operating at a second clock frequency twice said first clock frequency;
   means for adding said aperture signal to said three digital primary color signals; and
   video signal forming means for forming a digital video signal of a predetermined format from an output of said means for adding, said video signal forming means operating at said first clock frequency.

2. The video camera according to claim 1, wherein said three image pickup devices are a first CCD (charge-coupled device) for red color, a second CCD for green color and a third CCD for blue color, respectively.

3. The video camera according to claim 1, wherein said three image pickup devices are a first CCD for red color, a second CCD for green color and a third CCD for blue color, respectively, and said aperture signal forming means forms said aperture signal from outputs of said first and second CCDs.

4. The video camera according to claim 1, wherein said second clock frequency is 36 MHz and said first clock frequency is 18 MHz.

5. A video camera having three image pickup devices each operating at a first clock frequency and in which a pixel of a respective one of three channels forming three analog primary color signals is spatially displaced from pixels of said other two channels by ½ pixel, comprising:
   means for converting said three analog primary color signals from said three image pickup devices into three digital primary color signals, said means for converting operating at said first clock frequency;
   aperture signal forming means for forming an aperture signal from at least one of said three digital primary color signals, said aperture signal forming means operating at a second clock frequency twice said first clock frequency;
   first adding means for adding said aperture signal to said three digital primary color signals;
   means for forming color difference signals and a first luminance signal from an output of said first adding means, said means for forming color difference signals operating at said first clock frequency; and
   second adding means for adding said aperture signal to said first luminance signal to produce a second luminance signal, said second adding means operating at said second clock frequency.

6. The video camera according to claim 5, further comprising means for composing a digital composite video signal from said color difference signals and said second luminance signal.

7. The video camera according to claim 1, wherein said aperture signal forming means includes means for down-sampling said aperture signal to produce a down-sampled aperture signal having said first clock frequency, and said means for adding adds said down-sampled aperture signal to said three digital primary color signals.

8. The video camera according to claim 1, wherein said means for adding operates at said first clock frequency.

9. The video camera according to claim 1, wherein said digital video signal formed by said video signal forming means includes a luminance signal having said first clock frequency and color difference signals having said first clock frequency.

10. The video camera according to claim 5, wherein said aperture signal formed by said aperture signal forming means has said second clock frequency.

11. The video camera according to claim 10, wherein said aperture signal forming means includes means for down-sampling said aperture signal having said second clock frequency to produce a down-sampled aperture signal having said first clock frequency, said first adding means adds said down-sampled aperture signal to said three digital primary color signals, and said second adding means adds said aperture signal having said second clock frequency to said first luminance signal to produce said second luminance signal.

12. The video camera according to claim 11, wherein said first adding means operates at said first clock frequency.

13. The video camera according to claim 11, wherein said color difference signals and said first luminance signal formed by said means for forming have said first clock frequency.

14. The video camera according to claim 13, wherein said means for forming includes means for up-converting said first luminance signal having said first clock frequency to an up-converted luminance signal having said second clock frequency and said second adding means adds said aperture signal having said second clock frequency to said up-converted luminance signal to produce said second luminance signal having said second clock frequency.

15. The video camera according to claim 14, further comprising means for forming a digital composite video signal from said color difference signals having said first clock frequency and said second luminance signal having said second clock frequency.

16. A video camera having three image pickup devices each having equal pixel pitch for providing three respective analog primary color signals each having a first clock frequency, one of said three image pickup devices being arrayed with a spatial shift of one half the pixel pitch with respect to the other two of said three image pickup devices, said video camera comprising:

means for converting the analog primary color signal provided by said one image pickup device into a first digital primary color signal and for converting the other two analog primary color signals into second and third digital primary color signals, respectively;

aperture signal forming means for forming an aperture signal having a second clock frequency from said first digital primary color signal and from at least one of said second and third digital primary color signals, said second clock frequency being twice said first clock frequency;

means for down-sampling said aperture signal to produce a down-sampled aperture signal having said first clock frequency;

means for adding said down-sampled aperture signal to said first, second and third digital primary color signals; and video signal forming means for forming a digital video signal of a predetermined format from an output of said means for adding.

17. The video camera according to claim 16, further comprising means for processing each of said first, second and third digital primary color signals and wherein said means for adding adds said down-sampled aperture signal to each processed digital primary color signal.

18. The video camera according to claim 17, wherein said means for processing is a mask circuit which adjusts colors of said first, second and third digital primary color signals.

19. The video camera according to claim 17, wherein said means for processing is a gamma correction circuit.

20. The video camera according to claim 17, wherein said means for processing is a knee correction circuit.

21. The video camera according to claim 16, further comprising means for processing an output of said means for adding at said first clock frequency and wherein said video signal forming means forms said digital video signal from an output of said means for processing.

22. The video camera according to claim 21, wherein said means for processing is a gamma correction circuit.

23. The video camera according to claim 21, wherein said means for processing is a knee correction circuit.

24. A video camera having three image pickup devices each having equal pixel pitch for providing three respective analog primary color signals each having a first clock frequency, one of said three image pickup devices being arrayed with a spatial shift of one half the pixel pitch with respect to the other two of said three image pickup devices, said video camera comprising:

means for converting the analog primary color signal provided by said one image pickup device into a first digital primary color signal and for converting the other two analog primary color signals into second and third digital primary color signals, respectively;

aperture signal forming means for forming an aperture signal having a second clock frequency from said first digital primary color signal and from at least one of said second and third digital primary color signals, said second clock frequency being twice said first clock frequency;

means for down-sampling said aperture signal to produce a down-sampled aperture signal having said first clock frequency;

first adding means for adding said down-sampled aperture signal to said first, second and third digital primary color signals;

video signal forming means for forming a first digital luminance signal and digital color difference signals from an output of said first adding means, said first digital luminance signal and said digital color difference signals having said first clock frequency;

means for converting said first digital luminance signal having said first clock frequency to a second digital luminance signal having said second clock frequency; and second adding means for adding said aperture signal having said second clock frequency to said second digital luminance signal to produce an enhanced digital luminance signal.

25. The video camera according to claim 24, further comprising means for processing said first, second and third digital primary color signals at said first clock frequency, and wherein said first adding means adds said down-sampled aperture signal to each of the processed digital primary color signals.

26. The video camera according to claim 25, wherein said means for processing is a mask circuit which adjusts colors of said first, second and third digital primary color signals.

27. The video camera according to claim 25, wherein said means for processing is a gamma correction circuit.

28. The video camera according to claim 25, wherein said means for processing is a knee correction circuit.

29. The video camera according to claim 24, further comprising means for processing an output of said first adding means at said first clock frequency, and wherein said video signal forming means forms said first digital luminance signal and said digital color difference signals from an output of said means for processing.

30. The video camera according to claim 29, wherein said means for processing is a gamma correction circuit.

31. The video camera according to claim 29, wherein said means for processing is a knee correction circuit.

* * * * *